United States Patent
Xue et al.

(10) Patent No.: US 9,801,146 B2
(45) Date of Patent: Oct. 24, 2017

(54) TERMINAL AND SYNCHRONIZATION CONTROL METHOD AMONG TERMINALS

(71) Applicant: ZTE Corporation, Shenzhen (CN)

(72) Inventors: Tao Xue, Shenzhen (CN); Junchao Du, Shenzhen (CN); Hui Liu, Shenzhen (CN); Kunlun Zhao, Shenzhen (CN); Chunlong Zhang, Shenzhen (CN); Chang Liu, Shenzhen (CN); Lei Mao, Shenzhen (CN)

(73) Assignee: XI'AN ZTE NEW SOFTWARE COMPANY LIMITED, Xi'an (CN)

( * ) Notice: Subject to any disclaimer, the term of this patent is extended or adjusted under 35 U.S.C. 154(b) by 0 days.

(21) Appl. No.: 14/436,956

(22) PCT Filed: Aug. 15, 2013

(86) PCT No.: PCT/CN2013/081564
§ 371 (c)(1),
(2) Date: Apr. 20, 2015

(87) PCT Pub. No.: WO2014/063517
PCT Pub. Date: May 1, 2014

(65) Prior Publication Data
US 2015/0282106 A1 Oct. 1, 2015

(30) Foreign Application Priority Data

Oct. 24, 2012 (CN) .......................... 2012 1 0410127

(51) Int. Cl.
*H04L 12/16* (2006.01)
*H04W 56/00* (2009.01)
(Continued)

(52) U.S. Cl.
CPC ........... *H04W 56/00* (2013.01); *H04W 12/06* (2013.01); *H04W 56/0015* (2013.01);
(Continued)

(58) Field of Classification Search
CPC .............................. H04W 56/00; H04W 76/023
(Continued)

(56) References Cited

U.S. PATENT DOCUMENTS 7,962,161 B1 * 6/2011 Giallorenzi ........... H04W 48/14
 455/466
7,962,616 B2 6/2011 Kupferman
(Continued)

FOREIGN PATENT DOCUMENTS

CN 1479907 A 3/2004
CN 101142819 A 3/2008
(Continued)

OTHER PUBLICATIONS

International Search Report for corresponding application PCT/CN2013/081564 filed Aug. 13, 2013; Mail date Nov. 28, 2013.
(Continued)

*Primary Examiner* — Iqbal Zaidi
(74) *Attorney, Agent, or Firm* — Cantor Colburn LLP

(57) ABSTRACT

A terminal and a synchronization control method among terminals are provided. The method includes: a master controlling terminal establishing synchronization control connections with multiple controlled terminals respectively; the master controlling terminal delivering a unique authorization token held by the master controlling terminal to one controlled terminal among the multiple controlled terminals, to enable the current controlled terminal acquiring the authorization token to be capable of performing information interaction with the master controlling terminal for synchronization control processing. The solution can solve the problem of coordination interaction control between a master controlling terminal and multiple mutually independent controlled terminals, and avoid interaction conflict between the mutually independent controlled terminals. Moreover, the solution can further reduce the network bandwidth occupation and solve the problem of high network bandwidth occupation.

15 Claims, 3 Drawing Sheets

(51) Int. Cl.
*H04W 84/20* (2009.01)
*H04W 12/06* (2009.01)
*H04W 76/02* (2009.01)
*H04W 88/02* (2009.01)

(52) U.S. Cl.
CPC ......... *H04W 76/023* (2013.01); *H04W 84/20* (2013.01); *H04W 88/02* (2013.01)

(58) Field of Classification Search
USPC .................................................. 370/260–339
See application file for complete search history.

(56) References Cited

U.S. PATENT DOCUMENTS

| | | | |
|---|---|---|---|
| 2005/0063416 A1* | 3/2005 | Shin | ........................ H04L 69/32 370/465 |
| 2005/0080941 A1 | 4/2005 | Moll | |
| 2007/0010248 A1 | 1/2007 | Dravida | |
| 2008/0100532 A1 | 5/2008 | Lee | |
| 2009/0161602 A1* | 6/2009 | Matsumoto | ....... H04W 72/1242 370/328 |

FOREIGN PATENT DOCUMENTS

| | | |
|---|---|---|
| CN | 101183966 A | 5/2008 |
| CN | 101796827 A | 8/2010 |
| CN | 102334366 A | 1/2012 |
| CN | 102740248 A | 10/2012 |
| WO | 2010096683 A1 | 8/2010 |

OTHER PUBLICATIONS

European Search Report for corresponding application EP 13 84 9703; Report dated Oct. 7, 2015.

* cited by examiner

TERMINAL AND SYNCHRONIZATION CONTROL METHOD AMONG TERMINALS

TECHNICAL FIELD

The disclosure relates to the technical field of terminal synchronization control, and in particular to a synchronization control method among terminals in a mobile Internet environment and a corresponding terminal.

BACKGROUND

With the development of computer application technologies, a graphic interface has become a necessary part of various computing devices (mainframe, PC, portable devices). Meanwhile, graphic user interface (GUI)-based remote control also emerges, and has been applied more and more widely, including telecommuting, distance teaching, product demonstration, remote configuration, remote operation in high-risk areas, etc. Such technology provides a hardware condition for large scale applications of remote graphic interface access.

Remote synchronization control mainly refers to that a user accesses and controls another host by virtue of an interactive graphic interface via a device in a computer network. A remote synchronization control manner on the basis of window-based terminal simulation may better support the application of the graphic interface and have a good generality, and is a mainstream PC remote control method achieved by software currently. This remote synchronization control manner can acquire a screen window of a controlled host, process a remote-end keyboard event and monitor a remote-end keyboard input, share a catalogue file resource, and manage a remote-end host course, etc.

In recent years, numerous server-based computing (SBS) applications have appeared, such as XT800, PCAnywhere. Such software is based on a virtual network computing technology, and is capable of achieving synchronization control among computers cross interconnected networks. However, with the rapid development of the mobile Internet, inherent defects of the software have also manifested. For example, such software lacks support for the synchronization control technology among multiple irrelevant terminals, i.e. cannot monitor multiple mutually independent terminals at the same time.

With the popularity of smartphones, especially the rapid rise of mobile phones of the Android system and IOS system, a mobile terminal such as a mobile phone is no longer with the functions of normal phones merely, but is more and more used as a multimedia device by the user. In addition, one user does not only own one mobile terminal any longer as well, e.g. a user may own a laptop, a tablet, a smartphone, etc. at the same time. These objectively existing phenomena all propose actual demands and higher requirements for the synchronization control technology of the mobile Internet. Therefore, there is an urgent need for improving the synchronization control technology in the related art based on the inherent characteristics of the mobile Internet, so as to meet the increasing requirements of mobile devices for remote synchronization control.

SUMMARY

The embodiments of the disclosure provide a terminal and a synchronization control method among terminals, to at least solve the problem of coordination interaction control between a master controlling terminal and multiple mutually independent controlled terminals, and avoid interaction conflict between the mutually independent controlled terminals.

According to one embodiment of the disclosure, a synchronization control method among terminals applied to multiple terminals connected via a mobile Internet is provided. The method includes: a master controlling terminal establishing synchronization control connections with multiple controlled terminals respectively; the master controlling terminal delivering a unique authorization token held by the master controlling terminal to one controlled terminal among the multiple controlled terminals, to enable the current controlled terminal acquiring the authorization token to be capable of performing information interaction with the master controlling terminal for synchronization control processing.

In an example embodiment, the method above may further include: the master controlling terminal receiving one or more token application messages sent by one or more controlled terminals other than the current controlled terminal; and the master controlling terminal notifying a user to select a controlled terminal according to the one or more token application messages, taking back the authorization token of the current controlled terminal when the controlled terminal selected by the user is not the current controlled terminal, and delivering the authorization token to the controlled terminal selected by the user to switch the controlled terminal selected by the user to serve as the current controlled terminal.

In an example embodiment, the master controlling terminal establishing the synchronization control connections with multiple controlled terminals respectively may include: as regards each controlled terminal, the master controlling terminal establishing a connection between the controlled terminal and the master controlling terminal via the mobile Internet, and performing authentication on the controlled terminal after the connection is established, and determining that the synchronization control connection is established successfully after the authentication is passed.

In an example embodiment, the method above may further include: the master controlling terminal acquiring tile information of a screen of the current controlled terminal and image compression data of each tile, wherein the tile information includes a screen size and tile sizes of the current controlled terminal; and the master controlling terminal calculating ID of each tile according to the tile sizes, and constructing and displaying an image as a display interface of the current controlled terminal according to the screen size of the current controlled terminal and the image compression data of each tile.

In an example embodiment, the method above may further include: the master controlling terminal receiving a screen update data packet sent by the current controlled terminal, wherein the screen update data packet includes image compression data and at least one ID of at least one tile of which the image is updated; and the master controlling terminal updating at least one image of the at least one corresponding tile of the current controlled terminal displayed locally according to the image compression data and the at least one ID of the at least one tile of which the image is updated.

In an example embodiment, the method above may further include: sending an operation instruction input by a user to the current controlled terminal; receiving compression data of an image when executing the operation instruction returned by the current controlled terminal; and decompressing and displaying the compression data.

According to another embodiment of the disclosure, a master controlling terminal is further provided, including: a connection unit, configured to establish synchronization control connections with multiple controlled terminals respectively via a mobile Internet; and a token control unit, configured to deliver a unique authorization token held by the master controlling terminal to one controlled terminal among the multiple controlled terminals, to enable the current controlled terminal acquiring the authorization token to be capable of performing information interaction with the master controlling terminal for synchronization control processing.

In an example embodiment, the master controlling terminal above may further include: a receiving unit, configured to receive one or more token application messages sent by one or more controlled terminals other than the current controlled terminal; and the token control unit is further configured to notify a user to select a controlled terminal according to the one or more token application messages received by the receiving unit, take back the authorization token of the current controlled terminal when the controlled terminal selected by the user is not the current controlled terminal, and deliver the authorization token to the controlled terminal selected by the user to switch the controlled terminal selected by the user to serve as the current controlled terminal.

In an example embodiment, the master controlling terminal above may further include: a synchronization control unit, configured to acquire tile information of a screen of the current controlled terminal and image compression data of each tile, wherein the tile information includes a screen size and tile sizes of the current controlled terminal, and calculate ID of each tile according to the tile sizes, and construct and display an image as a display interface of the current controlled terminal according to the screen size of the current controlled terminal and the image compression data of each tile.

In an example embodiment, the synchronization control unit may further be configured to receive a screen update data packet sent by the current controlled terminal, wherein the screen update data packet includes image compression data and at least one ID of at least one tile of which the image is updated, and update at least one image of the at least one corresponding tile of the current controlled terminal displayed locally according to the image compression data and the at least one ID of the at least one tile of which the image is updated.

The synchronization control unit may further be configured to receive a screen update data packet sent by the current controlled terminal, wherein the screen update data packet includes image compression data and at least one ID of at least one tile of which the image is updated, and update at least one image of the at least one corresponding tile of the current controlled terminal displayed locally according to the image compression data and the at least one ID of the at least one tile of which the image is updated.

According to yet another embodiment of the disclosure, a controlled terminal is further provided, including: a connection unit, configured to establish a synchronization control connection with a master controlling terminal via a mobile Internet; a token acquisition unit, configured to receive a unique authorization token delivered by the master controlling terminal; and a synchronization processing unit, configured to perform synchronization control interaction with the master controlling unit after acquiring the authorization token.

In an example embodiment, the token acquisition unit may further be configured to send a token application message to the master controlling terminal to request the master controlling terminal for delivering the authorization token when the present terminal has not obtained the authorization token.

In an example embodiment, the synchronization processing unit may further be configured to divide a screen of the present terminal into tiles, and send the information of the screen and image compression data of each tile to the master controlling terminal for the master controlling terminal to construct and display an image as a display interface of the current controlled terminal, wherein the tile information includes a screen size and tile sizes of the current controlled terminal.

In an example embodiment, the synchronization processing unit may further be configured to divide a screen of the present terminal into tiles, and send tile information of the screen and image compression data of each tile to the master controlling terminal for the master controlling terminal to construct and display an image as a display interface of the current controlled terminal, wherein the tile information includes a screen size and tile sizes of the current controlled terminal.

In an example embodiment, the synchronization processing unit may further be configured to receive an operation instruction sent by the master controlling terminal, execute the operation instruction, and return compression data of an image when executing the operation instruction to the master controlling terminal.

It can be seen from the above that the terminal and synchronization control method among terminals provided by the embodiments of the disclosure take a mobile terminal-based star topology structure as a basis and introduces an interactive control idea of using an authorization token, thereby solving the problem of coordination interaction control between a master controlling terminal and multiple mutually independent controlled terminals, and effectively avoiding interaction conflict between the mutually independent controlled terminals. In addition, on the basis of the idea of tile division, the embodiments of the disclosure reduce the network bandwidth occupation to the greatest extent, and solve the problem of high network bandwidth occupation.

BRIEF DESCRIPTION OF THE DRAWINGS

Drawings, provided for further understanding of the disclosure and forming a part of the specification, are used to explain the disclosure together with embodiments of the disclosure rather than to limit the disclosure. In the accompanying drawings.

DESCRIPTION OF EMBODIMENTS

The disclosure will be described below in detail in combination with the accompanying drawings and specific embodiments, to make the objects, technical solutions and advantages of the disclosure more evident. Note that, the embodiments of the disclosure and the features of the embodiments can be combined with each other if there is no conflict.

As mentioned above, there are numerous problems in the related art, e.g., a lack of synchronization control realization of multiple irrelevant terminals, no consideration of a strict requirement of the mobile Internet for network traffic, etc. One embodiment of the disclosure takes a mobile terminal-based star network topology structure as a basis and introduces an interactive control idea of using an authorization token, thereby solving the problem of coordination interaction control between a master controlling terminal and multiple mutually independent controlled terminals, and effectively avoiding interaction conflict between the mutually independent controlled terminals. In addition, considering factors such as the strict requirement of the mobile Internet for the network traffic, one embodiment of the disclosure further reduces the network bandwidth occupation to the greatest extent and solves the problem of high network bandwidth occupation on the basis of the idea of tile division by synthesizing various methods.

Figure 1:
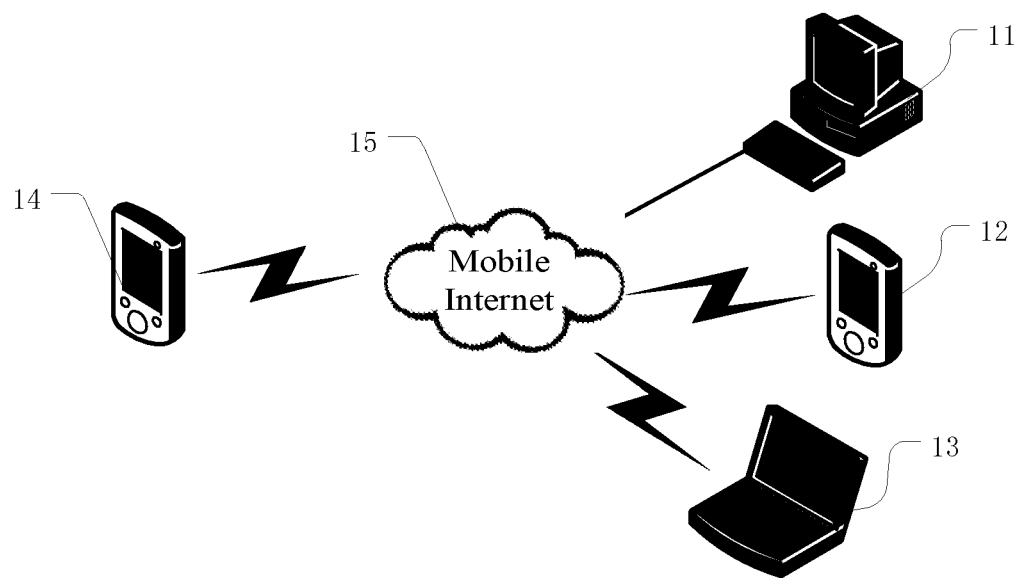
FIG. 1 is a diagram showing the mobile-terminal based star topology structure of an example of the disclosure.

In order to solve the problem above, as shown in FIG. 1, an embodiment of the disclosure design a set of communication system. The system applies a mobile terminal-based star topology structure, specifically including:

a master controlling terminal 14, which may specifically be a movable handheld device, a PC machine, a laptop (portable computer), etc., and is responsible for allocating an authorization token, acquiring display information on a target terminal, receiving interactive information from a user, and sending out an operation instruction to a controlled terminal;

controlled terminals 11-13, acting as responders of a control message, may include various forms of terminals, e.g. a laptop, a movable handheld device, a PC machine; 3 controlled terminals are provided in FIG. 1 as an example;

the mobile Internet 15: provides relevant services of network connections, etc. among terminals.

Figure 2:
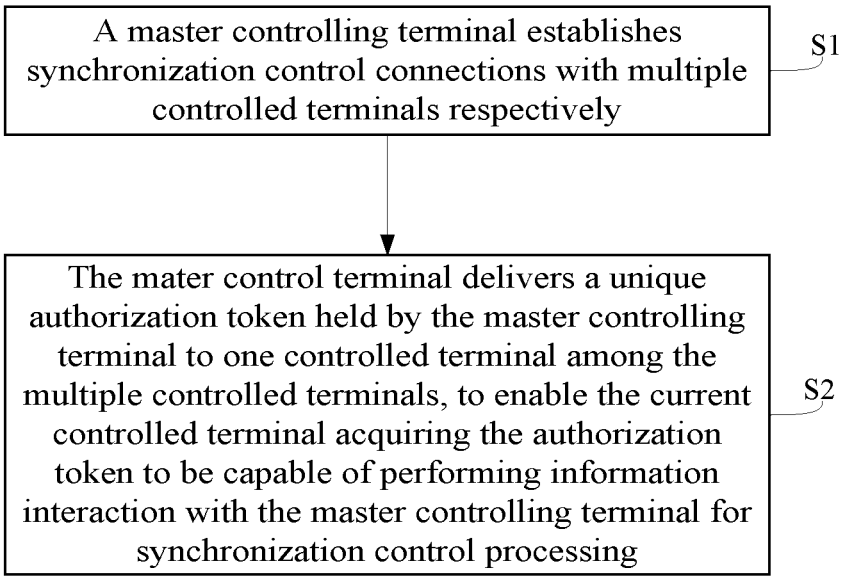
FIG. 2 is a schematic flowchart of a synchronization control method among terminals provided by an embodiment of the disclosure.

In order to achieve synchronization control for multiple irrelevant terminals, an embodiment of the disclosure provides a coordination control mechanism, the mechanism applying a token-based centralized access control scheme. Please refer to FIG. 2, the synchronization control method among terminals provided by an embodiment of the disclosure is applied to multiple terminals connected via the mobile Internet, including the following Steps S1 to S2.

In Step S1, a master controlling terminal establishes synchronization control connections with multiple controlled terminals respectively.

Here, as regards each controlled terminal, the master controlling terminal establishes a connection between the controlled terminal and the master controlling terminal via the mobile Internet, and performs authentication on the controlled terminal after the connection is established, and determines that the synchronization control connection is established successfully after the authentication is passed.

As an example embodiment, the connection above may specifically be a TCP connection. From the point of view of personal user security, after the connection above is established, the controlled terminal in this embodiment may further transmit ciphertext encrypted via SHA-1 to the master controlling terminal for authentication. If the authentication succeeds, the TCP connection is maintained; and if the authentication fails, the TCP connection is disconnected and the connection fails. In addition, the communication in this system may preferably be based on the SSL (secure socket layer) technology and support the AES (advanced encryption standard) encryption method, which may ensure the security of data in the transmission process.

In Step S2, the master controlling terminal delivers a unique authorization token held by the master controlling terminal to one controlled terminal among the multiple controlled terminals, to enable the current controlled terminal acquiring the authorization token to be capable of performing information interaction with the master controlling terminal for synchronization control processing.

Here, the master controlling terminal holds and only has one authorization token, and uniquely shares the authorization token with one monitored controlled terminal, i.e. among multiple controlled terminals, only one controlled terminal which shares the token with the master controlling terminal may execute a synchronization control interaction operation with the master controlling terminal. By delivering the authorization token and performing synchronization control information interaction via the uniquely shared authorization token with the controlled terminal by the master controlling terminal, in this embodiment, the controlled terminal currently acquiring the token is named as a current controlled terminal (also referred to as current controlled client, CDC). In the case other than the following Step S3, even the state changes (e.g. screen refreshing), the other controlled terminal will not sent out relevant information to the master controlling terminal.

By means of the authorization token-based interaction method, the embodiments of the disclosure solve the problem of coordination interaction control between a master controlling terminal and multiple mutually independent controlled terminals, and avoid interaction conflict between the mutually independent controlled terminals.

Furthermore, in an embodiment of the disclosure, the other controlled terminals may actively apply for the token to the master controlling terminal according to the emergency degree of the current state. At this moment, the method above may further include the following Steps S3 to S4.

In Step S3, the master controlling terminal receives one or more token application messages sent by one or more controlled terminals other than the current controlled terminal.

In Step S4, the master controlling terminal notifies a user to select a controlled terminal according to the one or more token application messages, takes back the authorization token of the current controlled terminal when the controlled terminal selected by the user is not the current controlled terminal, and delivers the authorization token to the controlled terminal selected by the user to switch the controlled terminal selected by the user to serve as the current controlled terminal.

Here, other controlled terminals may apply for the token according to the emergency degree of the current state. The emergency degree of the situations may be designated by a user himself as required. When emergency occurs to a controlled terminal without the authorization token, the controlled terminal may actively request to obtain the token permission from the master controlling terminal. When there is one or more controlled terminals actively applying for the token permission at a certain moment, the master controlling terminal may notify the user via a token application event, and the user may manually deliver the token to a certain controlled terminal with the most requirements according to the emergency degree of the actual situation. Of course, the user may actively submit a CDC change application to the master controlling terminal according to his wills to change the monitored current controlled terminal.

In order to achieve the purpose of saving traffic in an interaction process between the master controlling terminal and the current controlled terminal, the following Steps A and B are further used in the interaction process between the master controlling terminal and the current controlled terminal in an embodiment of the disclosure to save traffic.

In Step A, the master controlling terminal acquires tile information of a screen of the current controlled terminal and image compression data of each tile, wherein the tile information includes a screen size and tile sizes of the current controlled terminal; and the master controlling terminal calculates ID of each tile according to the tile sizes, and constructs and displays an image as a display interface of the current controlled terminal according to the screen size of the current controlled terminal and the image compression data of each tile.

Here the display screen of the current controlled terminal is divided into tiles and the image change of each tile is monitored, and tile information is packaged and sent to the master controlling terminal. The master controlling terminal sets a display area and tile sizes corresponding to the controlled terminal locally at the master controlling terminal according to this information.

As an embodiment, Step 1 above specifically includes: the controlled terminals calculate a main screen size of a display thereof respectively, and it is assumed in this embodiment that the screen size of the ith controlled terminal is $(Width_{screen}, Height_{screen})_i$. This rectangle is divided into several tiles, and it is assumed that the size thereof is $(Width_{tile}, Height_{tile})_i$, then the information borne by these tiles includes:

1) ID of the tile: this ID may be represented by a two-dimensional coordinate (idX, idY) of the tile, where idX and idY are integers and meet:

$0 \leq idX \leq \lceil Width_{screen}/Width_{tile} \rceil_i - 1$ $0 \leq idY \leq \lceil Height_{screen}/Height_{tile} \rceil_i - 1$ 2) an image boundary: since in the process of tile division, the height or width of the boundary tile at the right most side or the bottom most side may not be divided with no remainder by the height or width of the screen, a case where an image boundary of a tile area is smaller than a tile boundary will be caused, and thus the boundary needs to be recorded.

The tile information packaged and sent to the master controlling terminal in Step A above specifically includes a screen size $(Width_{screen}, Height_{screen})$CDC of the current controlled terminal and a tile size $(Width_{tile}, Height_{tile})$CDC. The master controlling terminal constructs a bitmap according to the width and height of the CDC for displaying a CDC interface. In addition, the ID allocation situation of each tile may be automatically calculated according to size information about the tile.

In Step B, the master controlling terminal receives a screen update data packet sent by the current controlled terminal, wherein the screen update data packet includes image compression data and at least one ID of at least one tile of which the image is updated; and the master controlling terminal updates at least one image of the at least one corresponding tile of the current controlled terminal displayed locally according to the image compression data and the at least one ID of the at least one tile of which the image is updated.

Here, if screen update occurs to the current controlled terminal, at least one screen sub-tile bitmap which has changed is packaged into a data packet after being compressed via a two-dimensional non-destructive linear interpolation (2DLI) algorithm and transmitted to the master controlling terminal. Specifically, the current controlled terminal may start a thread to monitor whether the image of each tile in an update area range changes. If any image change, the image of this tile is compressed via the 2DLI compression algorithm and is sent to the master controlling terminal, otherwise no change is sent. The master controlling terminal acquires the size $(Width_{tile}, Height_{tile})$CDC tile of each tile of the screen from the current controlled terminal.

The master controlling terminal receives a compression data packet from the current controlled terminal and decompresses and reconstructs the data packet. When the screen of the current controlled terminal changes, the current controlled terminal automatically transmits one or more tiles of which the content changes to the master controlling terminal successfully, wherein the transmitted information includes one or more tile IDs and one or more tile images. The master controlling terminal performs a corresponding image update operation according to this tile information.

In the synchronization control process, the master controlling terminal may input an operation instruction on a local screen, such that the current controlled terminal is controlled to execute a corresponding operation. The method for controlling the current controlled terminal to execute a corresponding operation further includes the following Steps C to E.

In Step C, an operation instruction input by a user is sent to the current controlled terminal.

In Step D, compression data of an image when executing the operation instruction returned by the current controlled terminal is received.

In Step E, the compression data is decompressed and displayed.

In the Steps above, if the master controlling terminal receives the operation instruction from the user, the instruction is packaged into a packet, and is then sent to the current controlled terminal for further relevant processing. For example, if the user performs a drag operation on the display screen of the master controlling terminal, the ID of the first tile (First ID) and the ID of the last tile (Last ID) of an area required to be updated are transmitted to the current controlled terminal. The current controlled terminal returns image information about the corresponding tiles to the master controlling terminal on this basis, wherein each time may return information about one tile, and the returned information content may be the same as that in Step B, including tile ID and a tile image. After having received the data packet, the master controlling terminal performs a decompression and a corresponding image update operation in Step E. When the user clicks on the master controlling terminal screen, the master controlling terminal transmits the ID of a tile where the contact point is located and an offset of the contact point in the tile to the current controlled terminal. The current controlled terminal maps the information as an instruction identifiable by itself to perform a further processing operation, and returns image information in the processing operation process to the master controlling terminal.

On the basis of the method above, an embodiment of the disclosure further provide a master controlling terminal and a controlled terminal.

The master controlling terminal provided by this embodiment includes:

a connection unit, configured to establish synchronization control connections with multiple controlled terminals respectively via the mobile Internet; and a token control unit, configured to deliver a unique authorization token held by the master controlling terminal to one controlled terminal among the multiple controlled terminals, to enable the current controlled terminal acquiring the authorization token to be capable of performing information interaction with the master controlling terminal for synchronization control processing.

In an example embodiment, the master controlling terminal above may further include: a receiving unit, configured to receive one or more token application messages sent by one or more controlled terminals other than the current controlled terminal. In this embodiment, the token control unit is further configured to notify a user to select a controlled terminal according to the one or more token application messages received by the receiving unit, take back the authorization token of the current controlled terminal when the controlled terminal selected by the user is not the current controlled terminal, and deliver the authorization token to the controlled terminal selected by the user to switch the controlled terminal selected by the user to serve as the current controlled terminal.

In an example embodiment, the master controlling terminal above may further include: a synchronization control unit, configured to acquire tile information of a screen of the current controlled terminal and image compression data of each tile, wherein the tile information includes a screen size and tile sizes of the current controlled terminal, and calculate an ID of each tile according to the tile sizes, and construct and display an image as a display interface of the current controlled terminal according to the screen size of the current controlled terminal and the image compression data of each tile.

In an example embodiment, the synchronization control unit may further be configured to receive a screen update data packet sent by the current controlled terminal, wherein the screen update data packet includes image compression data and at least one ID of at least one tile of which the image is updated, and update at least one image of the at least one corresponding tile of the current controlled terminal displayed locally according to the image compression data and the at least one ID of the at least one tile of which the image is updated.

In an example embodiment, the synchronization unit may further be configured to send an operation instruction input by a user to the current controlled terminal, receive compression data of an image when executing the operation instruction returned by the current controlled terminal, and decompress and display the compression data.

The controlled terminal provided by this embodiment includes:

a connection unit, configured to establish a synchronization control connection with a master controlling terminal via the mobile Internet;

a token acquisition unit, configured to receive a unique authorization token delivered by the master controlling terminal; and a synchronization processing unit, configured to perform synchronization control interaction with the master controlling unit after acquiring the authorization token.

The token acquisition unit may further be configured to send a token application message to the master controlling terminal to request the master controlling terminal for delivering the authorization token when the present terminal has not obtained the authorization token.

The synchronization processing unit may further be configured to divide a screen of the present terminal into tiles, and send tile information of the screen and image compression data of each tile to the master controlling terminal for the master controlling terminal to construct and display an image as a display interface of the current controlled terminal, wherein the tile information includes a screen size and tile sizes of the current controlled terminal.

In an example embodiment, the synchronization processing unit may further be configured to monitor each tile of the screen of the present terminal, and send a screen update data packet including image compression data and at least one ID of at least one tile of which the image is updated to the master controlling terminal, such that the master controlling terminal updates at least one image of the at least one corresponding tile of the current controlled terminal displayed locally.

In an example embodiment, the synchronization processing unit may further be configured to receive an operation instruction sent by the master controlling terminal, execute the operation instruction, and return compression data of an image when executing the operation instruction to the master controlling terminal.

The embodiments of the disclosure above will further described below in detail further by more detailed diagrams and examples.

Still, the mobile terminal-based star topology network as shown in FIG. 1 is taken as an example. The terminal 14 is a unique master controlling terminal in the system, and is an Android smartphone which is the most popular on the market currently in this example. Terminals 11-13 are three controlled terminals used in this embodiment, which are respectively a PC machine, an Android smartphone and a laptop. The master controlling terminal and the controlled terminals respectively install and operate a client program and a server program of the system.

Figure 3:
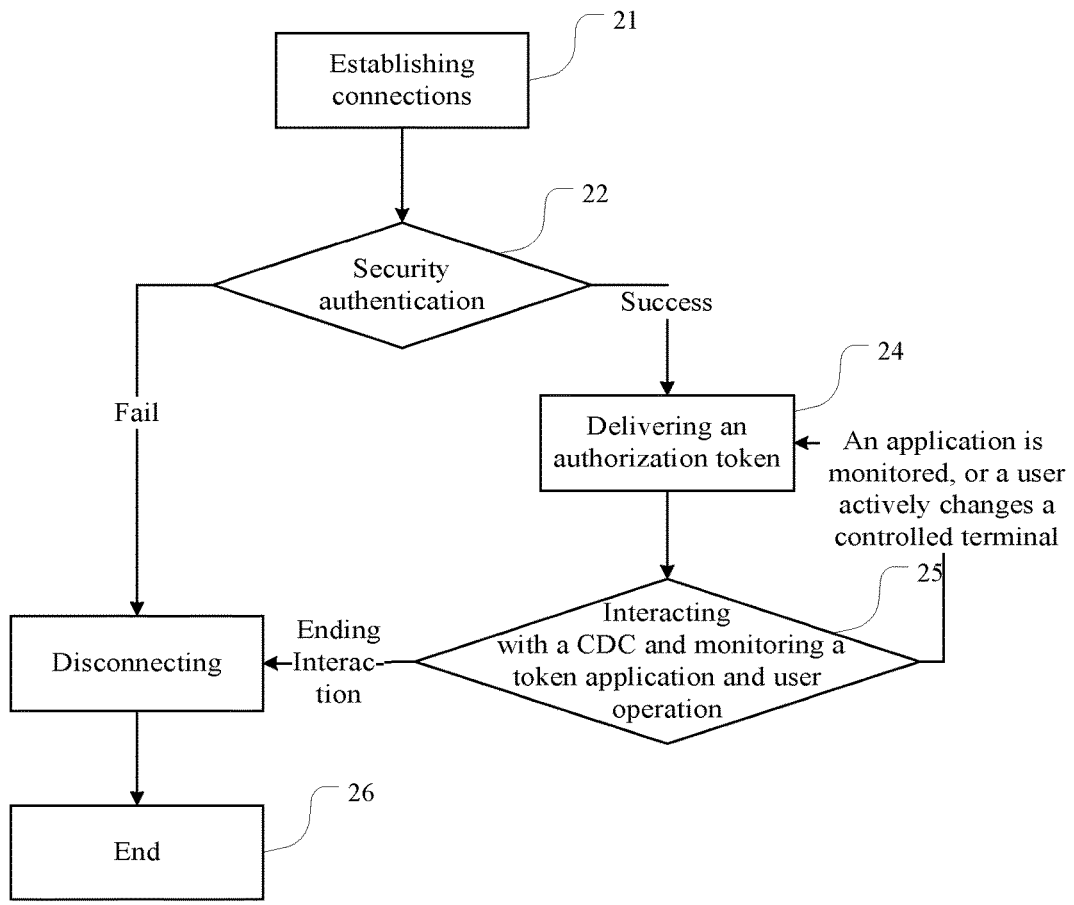
FIG. 3 is a main flow diagram of a system designed in an example of the disclosure.

FIG. 3 is a main flow diagram of a system related to in this example. As shown in FIG. 3, the flow mainly includes the following Steps 21 to 25.

In Step 21, the master controlling terminal establishes network connections with the controlled terminals respectively.

In Step 22, a user inputs a verification code via the master controlling terminal and performs security authentication on the controlled terminals which have established the connections respectively, and if the authentication fails, Step 23 is executed, otherwise Step 24 is executed.

In Step 23, the master controlling terminal disconnects from a controlled terminal of which the authentication has failed, and executes Step 26 to end this session task.

In Step 24, the user selects a controlled terminal CDC needing to be monitored and delivers an authorization token to the CDC via the master controlling terminal. After having received the token, the CDC successfully acquires a permission to perform mutual communication with the master controlling terminal, and then Step 25 is executed.

In Step 25, when a token application or a CDC application change initiated by the user is not detected, the master controlling terminal and the CDC perform conventional interaction operations, including image tile update, a user operation interactive response, etc., until the master controlling terminal or CDC actively ends interaction and enters Step 23. When the token application is detected, the master controlling terminal notifies the user by a token application event so that the user has the judgement right to designate the CDC by himself. The master controlling terminal then delivers the token to the controlled terminal and performs a relevant interaction operation therewith.

Figure 4:
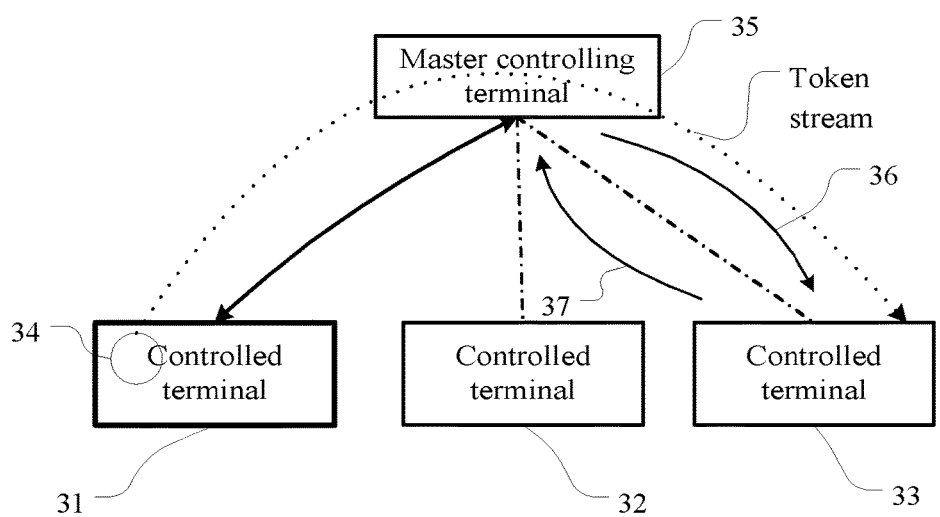
FIG. 4 is a schematic diagram showing the token-based authorization control of an example of the disclosure.

FIG. 4 is a schematic diagram showing the token-based authorization control process of this example. Terminals 31, 32 and 33 are three controlled terminals respectively, wherein the terminal 31 is a CDC and has an authorization token 34. A terminal 35 is a unique master controlling terminal in the system. The terminals 32 and 33 likewise have successfully established connections with 35 respectively, but since the token is not acquired, the terminals cannot interact with the master controlling terminal 35. At the current moment, the master controlling terminal 35 is performing an interaction operation with the CDC 31. Assuming that there is an emergency on the terminal 33 at this moment, and the token needs to be acquired immediately to perform an interaction operation, for this purpose, a token application message 37 is sent to the master controlling terminal 35. After having received the application, the master controlling terminal 35 notifies a user by a token application event, and if the user allows the application, the master controlling terminal 35 immediately takes back the token of the terminal 31 and forwards same to the terminal 33, i.e. a process 36, thus performing a data interaction operation with the terminal 33.

Figure 5:
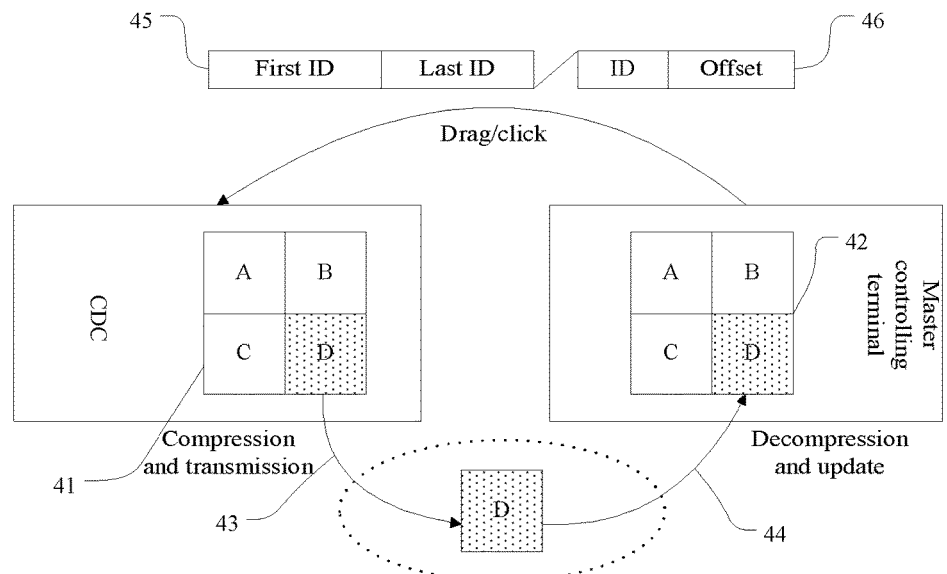
FIG. 5 is a schematic diagram showing the sub-tile division and reconstruction of an example of the disclosure.

FIG. 5 is a schematic diagram showing the sub-tile division and reconstruction method of this example. As shown in FIG. 5, the method includes the following Steps 41 to 46.

In Step 41, according to the tile division method introduced in the summary, a CDC screen is divided into tiles and relevant information is recorded, including ID and image boundary of each tile. In this example, it is assumed that the CDC divides the screen thereof into four tiles, which are respectively marked as A, B, C and D, and the ID thereof is (0, 0), (0, 1), (1, 0) and (1, 1) respectively. In this example, since the case where the height or width of the tile cannot be divided with no remainder by the height or width of the screen at the boundary of the right most side or the bottom most side does not exist, the image boundary is the boundary of each tile. The CDC sends this tile information to the master controlling terminal via the mobile Internet.

In Step 42, the master controlling terminal constructs a bitmap according to the width and height of the CDC for displaying a CDC interface. In addition, according to size information about the tile, an ID allocation of each tile may be automatically calculated. In this example, the ID of each tile is A(0, 0); B(0, 1); C(1, 0); D (1, 1).

In Step 43, a CDC server starts a thread to monitor whether the image of each tile in an update area range changes. If at a certain moment, the tile D changes, then the CDC packages the ID (1, 1) of the tile together with an image within the area into a packet, and sends the packet to the master controlling terminal via the mobile Internet after compressing the packet via the 2DLI algorithm.

In Step 44, after having received the packet, the master controlling terminal decompresses the packet and acquires the ID (1, 1) of the tile needing to be updated and automatically performs positioning according to this ID, and performs a refreshing processing thereafter.

In Step 45, because of the screen size, the interface of the controlled terminal may not be completely displayed on the master controlling terminal. For example, in this example, the master controlling terminal is an Android mobile phone, and current mainstream resolution is 480*800 pixels, while the mainstream resolution of the PC machine of the controlled terminal is 1440*900 pixels. Therefore, in order to view the full screen, a drag operation needs to be performed if necessary. Assuming that the interfaces currently needing to be displayed are B and D, then when a user is dragging, a data packet of {FirstID=(0, 1), LastID=(1, 1)} will be generated and is transmitted to the CDC via the mobile Internet. The CDC packages the tiles B(0, 1) and D(1, 1) contained in the whole rectangle area of which the main diagonal line is FirstID and LastID together with images into a packet, sends the packet to the master controlling terminal after 2DLI algorithm compression, and then executes Step 44.

In Step 46, when the user executes an opt (e.g. clicking) operation on the master controlling terminal, the master controlling terminal transmits the ID of the tile where the contact point is located and an offset of the contact point in the tile to the CDC. For example, in this example, the user clicks an offset (20, 30) in the tile D, then the master controlling terminal generates a data packet of {ID=(1, 1), offset=(20, 30), opt=click} to the CDC. The CDC parses the data packet and maps the data packet as a local corresponding operation function to operate. Then, the CDC packages ID of the opt area together with an image into a packet, and sends the packet to the master controlling terminal after the 2DLI algorithm compression, and executes Step 44.

Figure 6:
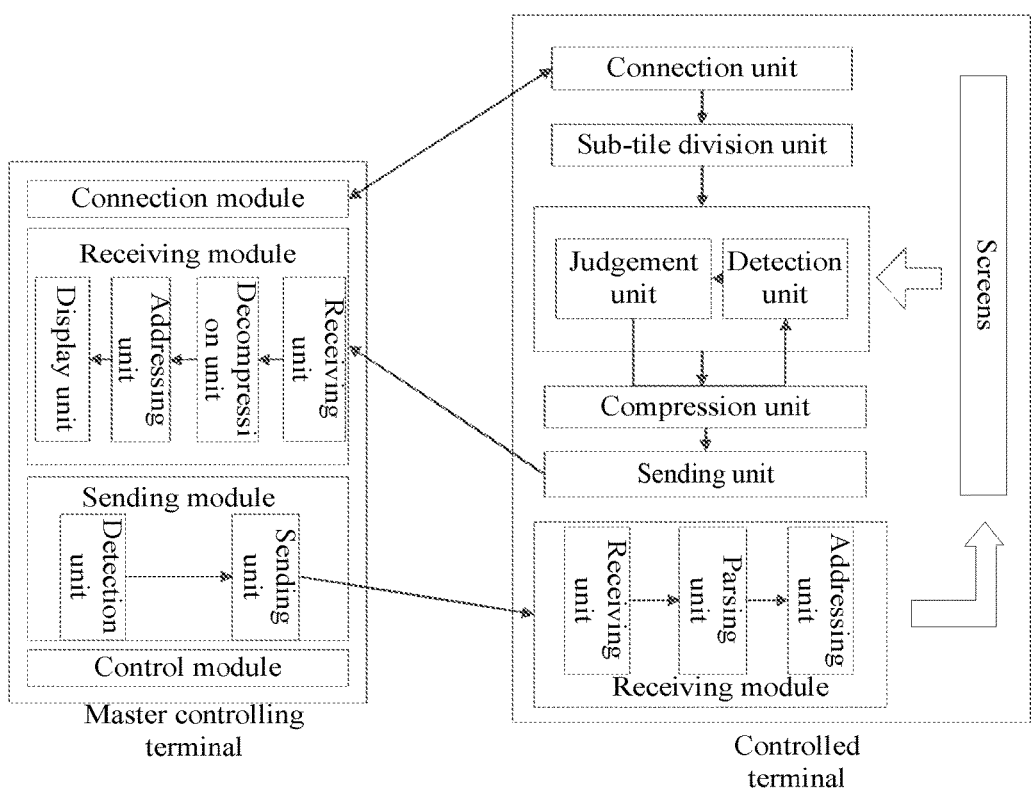
FIG. 6 is a system frame diagram of an example of the disclosure.

FIG. 6 is a system frame designed in this example. As shown in FIG. 6, the system frame is described in detail as follows.

The master controlling terminal is divided into four modules, which are respectively a connection module, a receiving module, a sending module and a control module. The receiving module mainly includes a receiving unit, a decompression unit, an addressing unit and a display unit. The sending module mainly includes a detection unit and a sending unit.

The controlled terminal mainly includes a connection unit, a sub-tile division unit, a detection and judgement unit, a compression unit a sending unit and a receiving module. The receiving module mainly includes a receiving unit, a parsing unit and an addressing unit.

Many functional components described in this description are referred to as modules, so as to especially emphasize the independence of the implementation thereof.

In the embodiments of the disclosure, modules may be implemented by software, so as to be executed by various processors. For example, an identified executable code module may include one or more physical or logical blocks of computer instructions, e.g. which may be constructed as an object, a process of a function. Even so, the executable code of the identified module does not need to be physically located together, instead, may include different instructions stored in different physical blocks, and when being logically combined together, these instructions construct a module and achieve a specified purpose of the module.

Actually, the executable code module may be a single or multiple instructions, and may even be distributed on multiple different code segments, distributed in different programs, and distributed across multiple storage devices. Likewise, operation data may be identified within the module, and may be implemented in accordance with any appropriate form and organized in any appropriate type of data structure.

The operation data may be collected as a single data set, or may be distributed on different locations (including on different storage devices), and may at least partially exist on a system or network merely as an electronic signal.

When the module may be implemented using software, considering the level of the existing hardware process, for the module which may be implemented by software, those skilled in the art may build a corresponding hardware circuit to achieve corresponding functions without considering the cost, the hardware circuit including conventional very large-scale integrated (VLSI) circuit or gate array and the existing semiconductor such as a logical chip and a transistor or other separate elements. The module may also be implemented in a programmable hardware device such as a field programmable gate array, programmable array logic, a programmable logic device.

What mentioned above are merely embodiments of the disclosure, and it should be explained that various improvements or modifications can also be made by those skilled in the art within the principle of the disclosure and shall fall within the protection scope defined in the claims of the disclosure.

What is claimed is:

1. A synchronization control method among terminals, wherein the method is applied to multiple terminals connected via a mobile Internet, and comprises:
    a master controlling terminal establishing synchronization control connections with multiple controlled terminals respectively; and
    the master controlling terminal delivering a unique authorization token held by the master controlling terminal to one controlled terminal among the multiple controlled terminals, to enable the controlled terminal acquiring the authorization token to be capable of performing information interaction with the master controlling terminal for synchronization control processing;
    the master controlling terminal performing synchronization control interaction with the controlled terminal acquiring the authorization token;
    wherein the master controlling terminal establishing the synchronization control connections with the multiple controlled terminals respectively comprises: as regards each controlled terminal, the master controlling terminal establishing a connection between the controlled terminal and the master controlling terminal via the mobile Internet, performing authentication on the controlled terminal after the connection is established, and determining that the synchronization control connection is established successfully after the authentication is passed.

2. The method according to claim 1, further comprising:
    the master controlling terminal receiving one or more token application messages sent by one or more controlled terminals other than the controlled terminal acquiring the authorization token; and
    the master controlling terminal notifying a user to select a controlled terminal according to the one or more token application messages, taking back the authorization token of the controlled terminal acquiring the authorization token when the controlled terminal selected by the user is not the controlled terminal acquiring the authorization token, and delivering the authorization token to the controlled terminal selected by the user to switch the controlled terminal selected by the user to serve as the controlled terminal acquiring the authorization token.

3. The method according to claim 2, wherein the master controlling terminal establishing the synchronization control connections with the multiple controlled terminals respectively comprises:
    as regards each controlled terminal, the master controlling terminal establishing a connection between the controlled terminal and the master controlling terminal via the mobile Internet, performing authentication on the controlled terminal after the connection is established, and determining that the synchronization control connection is established successfully after the authentication is passed.

4. The method according to claim 1, comprising:
    the master controlling terminal acquiring tile information of a screen of the controlled terminal acquiring the authorization token and image compression data of each tile, wherein the tile information comprises a screen size and tile sizes of the controlled terminal acquiring the authorization token; and
    the master controlling terminal calculating identifier (ID) of each tile according to the tile sizes, and constructing and displaying an image as a display interface of the controlled terminal acquiring the authorization token according to the screen size of the controlled terminal acquiring the authorization token and the image compression data of each tile.

5. The method according to claim 4, further comprising:
    the master controlling terminal receiving a screen update data packet sent by the controlled terminal acquiring the authorization token, wherein the screen update data packet comprises image compression data and at least one ID of at least one tile of which the image is updated; and
    the master controlling terminal updating at least one image of the at least one corresponding tile of the controlled terminal acquiring the authorization token displayed locally according to the image compression data and ID of the at least one tile of which the image is updated.

6. The method according to claim 4, further comprising:
    sending an operation instruction input by a user to the controlled terminal acquiring the authorization token;
    receiving compression data of an image when executing the operation instruction returned by the controlled terminal acquiring the authorization token; and
    decompressing and displaying the compression data.

7. A master controlling terminal, comprising a hardware processor, which is configured to perform functions of a connection unit and a token control unit:
    the connection unit, configured to establish synchronization control connections with multiple controlled terminals respectively via a mobile Internet; and
    the token control unit, configured to deliver a unique authorization token held by the master controlling terminal to one controlled terminal among the multiple controlled terminals, to enable the controlled terminal acquiring the authorization token to be capable of performing information interaction with the master controlling terminal for synchronization control processing; and perform synchronization control interaction with the controlled terminal acquiring the authorization token;
    wherein the connection unit is further configured to establish synchronization control connections with multiple controlled terminals respectively via a mobile Internet by following steps: as regards each controlled terminal, establish a connection between the controlled terminal and the master controlling terminal via the mobile Internet, perform authentication on the controlled terminal after the connection is established, and determine that the synchronization control connection is established successfully after the authentication is passed.

8. The master controlling terminal according to claim 7, the hardware professor is further configured to perform functions of a receiving unit:
the receiving unit, configured to receive one or more token application messages sent by one or more controlled terminals other than the controlled terminal acquiring the authorization token; and
the token control unit is further configured to notify a user to select a controlled terminal according to the one or more token application messages received by the receiving unit, take back the authorization token of the controlled terminal acquiring the authorization token when the controlled terminal selected by the user is not the controlled terminal acquiring the authorization token, and deliver the authorization token to the controlled terminal selected by the user to switch the controlled terminal selected by the user to serve as the controlled terminal acquiring the authorization token.

9. The master controlling terminal according to claim 7, the hardware professor is further configured to perform functions of a synchronization control unit:
the synchronization control unit, configured to acquire tile information of a screen of the controlled terminal acquiring the authorization token and image compression data of each tile, wherein the tile information comprises a screen size and tile sizes of the controlled terminal acquiring the authorization token, and calculate identifier (ID) of each tile according to the tile sizes, and construct and display an image as a display interface of the controlled terminal acquiring the authorization token according to the screen size of the controlled terminal acquiring the authorization token and the image compression data of each tile.

10. The master controlling terminal according to claim 9, wherein
the synchronization control unit is further configured to receive a screen update data packet sent by the controlled terminal acquiring the authorization token, wherein the screen update data packet comprises image compression data and at least one ID of at least one tile of which the image is updated, and update at least one image of the at least one corresponding tile of the controlled terminal acquiring the authorization token displayed locally according to the image compression data and ID of the at least one tile of which the image is updated.

11. The master controlling terminal according to claim 9, wherein
the synchronization unit is further configured to send an operation instruction input by a user to the controlled terminal acquiring the authorization token, receive compression data of an image when executing the operation instruction returned by the controlled terminal acquiring the authorization token, and decompress and display the compression data.

12. A controlled terminal, comprising a hardware processor, which is configured to perform functions of a connection unit, a token acquisition unit and a synchronization processing unit:
the connection unit, configured to establish a synchronization control connection with a master controlling terminal via a mobile Internet;
the token acquisition unit, configured to receive a unique authorization token delivered by the master controlling terminal; and
the synchronization processing unit, configured to perform synchronization control interaction with the master controlling terminal after acquiring the authorization token;
wherein the token acquisition unit is further configured to send a token application message to the master controlling terminal to request the master controlling terminal for delivering the authorization token when the present terminal has not obtained the authorization token.

13. The controlled terminal according to claim 12, wherein
the synchronization processing unit is further configured to divide a screen of the present terminal into tiles, and send tile information of the screen and image compression data of each tile to the master controlling terminal for the master controlling terminal to construct and display an image as a display interface of the controlled terminal acquiring the authorization token, wherein the tile information comprises a screen size and tile sizes of the controlled terminal acquiring the authorization token.

14. The controlled terminal according to claim 12, wherein
the synchronization processing unit is further configured to monitor each tile of the screen of the present terminal, and send a screen update data packet comprising image compression data and at least one ID of at least one tile of which the image is updated to the master controlling terminal, so that the master controlling terminal updates at least one image of the at least one corresponding tile of the controlled terminal acquiring the authorization token displayed locally.

15. The controlled terminal according to claim 12, wherein
the synchronization processing unit is further configured to receive an operation instruction sent by the master controlling terminal, execute the operation instruction, and return compression data of an image when executing the operation instruction to the master controlling terminal.

* * * * *